Figure 1:
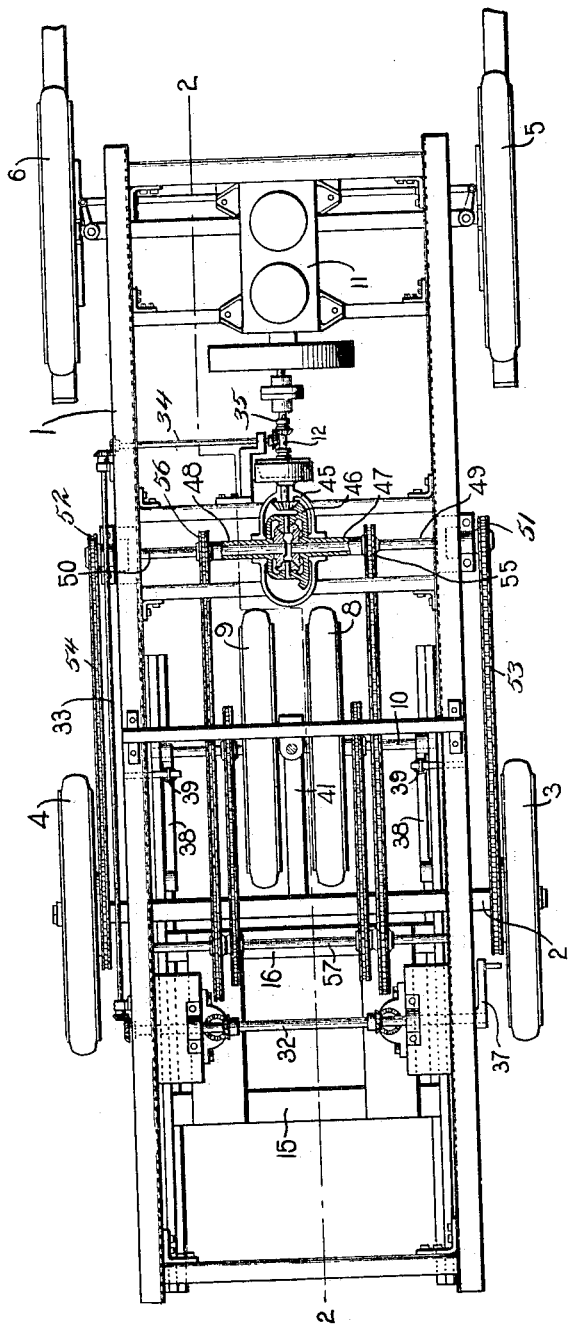

F. T. KINDAHL.
AUTOMOBILE SLED.
APPLICATION FILED APR. 6, 1914.

1,117,677.

Patented Nov. 17, 1914.
2 SHEETS—SHEET 1.

Witnesses.
J. Morrill Fuller
William E. Gagen

Inventor.
Fredrick T. Kindahl
by Heard Smith & Tennant.
Att'y's

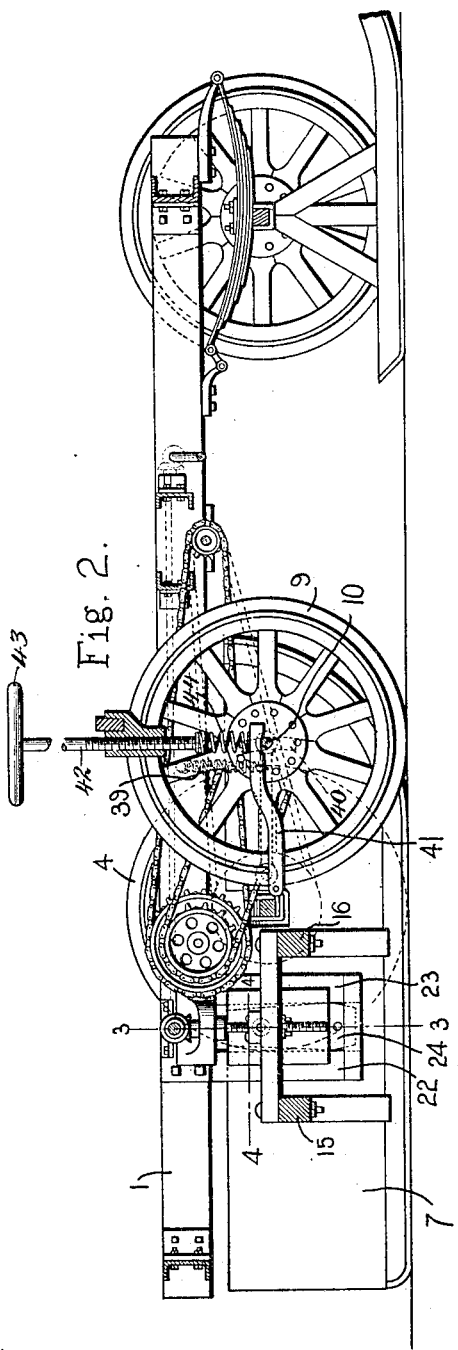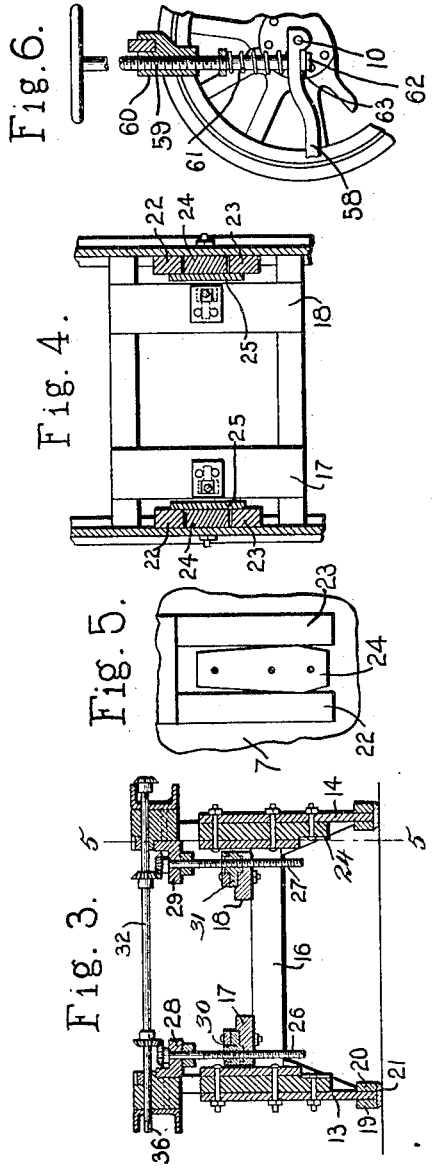

UNITED STATES PATENT OFFICE.

FREDRICK T. KINDAHL, OF BELMONT, MASSACHUSETTS.

AUTOMOBILE SLED.

1,117,677.  Specification of Letters Patent. Patented Nov. 17, 1914.

Application filed April 6, 1914. Serial No. 829,800.

*To all whom it may concern:*

Be it known that I, FREDRICK T. KINDAHL, a citizen of the United States, and resident of Belmont, county of Middlesex, State of Massachusetts, have invented an Improvement in Automobile Sleds, of which the following description, in connection with the accompanying drawing, is a specification, like characters on the drawing representing like parts.

This invention has reference to motor vehicles and more particularly to a sled to be carried thereby.

Motor vehicles are substantially useless when there is much snow upon the ground, particularly upon little traveled roads, by reason of the increased resistance offered to the wheels. As is well known the resistance offered to sleds under similar conditions is much less by reason of the extended contact with the ground.

Accordingly the present invention has for an object to provide means whereby the advantages of sleds may be obtained while retaining the tractive power of the motor vehicle.

The invention has also for an object to provide means for readily converting a motor truck into a sliding vehicle in order to facilitate travel upon roads of varying condition.

Another object is to provide an improved sled of strong and durable construction which may be applied to an automobile and which will be sufficiently strong to carry the weight thereof.

Another object is to provide additional traction means adjustable to provide the necessary traction with the road bed for driving the vehicle when the sled is in use.

Referring to the drawings in which I have illustrated a selected embodiment of my invention, Figure 1 is a plan view of an automobile truck with a sled constructed in accordance with my invention carried thereby. Fig. 2 is a central sectional view longitudinally of the device taken on the line 2—2 Fig. 1; Fig. 3 is a sectional view on the line 3—3 Fig. 2; Fig. 4 is a sectional view on the line 4—4 Fig. 2, Fig. 5 is a sectional view on the line 5—5 Fig. 3, and Fig. 6 is a detail view showing another form of means for applying pressure downwardly upon the auxiliary traction wheels.

Referring to the drawings in detail, the chassis of an automobile is illustrated at 1 and at 2 I have indicated a rear axle which is connected to the chassis by suitable springs and upon which are mounted the usual wheels 3, 4. These wheels are differentially driven in the usual manner. Front wheels 5, 6 are provided as usual.

In accordance with my invention, I provide a sled 7 carried by the chassis between the rear wheels and adjustable vertically with respect thereto. The sled may be adjusted to such a vertical position that the rear wheels will contact with the ground with just sufficient force to provide the necessary traction and the usual springs between these wheels and the chassis will maintain the contact wherever the surface of the ground is irregular. I prefer however to provide auxiliary traction wheels 8, 9 secured to a floating shaft 10, and I have illustrated these wheels as positioned centrally of the machine and near the forward end of the sled. An engine 11 having a driving shaft 12 provides the necessary power for driving the rear wheels and the auxiliary traction wheels. The front wheels are provided with runners of any suitable or desired construction.

The sled must necessarily be of strong and rigid construction in order to support the weights usually carried by vehicles of this character. The structure illustrated comprises side members 13, 14 made of steel plate, cross bars 15, 16 secured to the side members and longitudinal members 17, 18 which provide a platform to which the gearing for controlling the vertical position of the sled may be connected. Strips 19, 20 are bolted to each side member at the lower edge thereof to provide broad supports for the shoes 21. These shoes however are in contact with the lower edges of the steel plates so that the weight is carried directly by the steel plates, the strips 19, 20 merely serving as braces to hold the shoes in correct position. The shoes may thus be made of any desired width while the steel plate is made no thicker than is necessary to provide the required strength.

The sled is connected to the chassis in a manner to permit vertical movement and rocking movement in a vertical plane while preventing angular movement in a horizontal plane. I have illustrated a preferred structure in which guides 22, 23 are rigidly secured to the chassis providing ways between which a block 24 secured to each side member of the sled may be guided. The plates 24 are shaped at each edge so as to permit a limited rocking movement between the ways 22, 23. A second plate 25 is secured to the plate 24 and projects over the edges of the guides 22, 23 to hold the parts in position.

The gearing for controlling the vertical movement of the sled is best shown in Fig. 3. A pair of right and left threaded screws 26, 27, are mounted in the brackets 28, 29 secured to the chassis in a manner to permit rotation but prevent longitudinal movement. These screws operate in nuts 30, 31 respectively which are secured to the longitudinal members 17, 18 in a manner to permit a limited rocking movement. These screws are connected to a cross shaft 32 by means of bevel gears and this cross shaft is in turn connected by suitable gearing to a shaft 33 extending longitudinally of the chassis. This shaft may be connected to the drive shaft by any suitable gearing to provide means whereby the power of the engine may be employed to raise and lower the sled. I have illustrated a shaft 34 geared to the shaft 33 and connected to the drive shaft 12 by bevel gears one of which is slidable on the drive shaft as indicated at 35. The end of the shaft 32 preferably extends beyond the side of the chassis and is made square as indicated at 36 to receive a crank 37 thereby providing a means for manual operation.

The floating shaft 10 is carried by links 38, pivoted to the side members of the sled and having bearings to receive the shaft. Springs 39 connected to the links serve as means to raise the shaft. The ends of the shaft are also guided in slots 40 in the two side members. By this construction, a tilting movement of this shaft is permitted as well as a vertical movement so that the wheels may accommodate themselves to irregularities in the road bed. The means illustrated for applying pressure downwardly upon the shaft 10 comprises a bearing arm 41 pivoted to the rear axle and positioned to engage the shaft between the wheels 8, 9. Pressure may be applied thereto by means of a screw 42 to the upper end of which is connected a hand wheel 43. A spring 44 is preferably positioned between the end of the screw and the block. By this means an adjustable resilient pressure may be applied to the auxiliary wheels 8, 9.

Any suitable gearing may be provided to drive the rear wheels and the auxiliary traction wheels. I have illustrated a preferred form in which the auxiliary traction wheels are connected to be positively driven at a fixed speed by the drive shaft and the rear wheels are differentially driven. A gear casing 45 is rigidly connected to the chassis. The drive shaft 12 extends through a bearing into the gear case. A differential carrier 46 having sleeves 47, 48 is rotatably mounted in the casing and is connected by beveled gearing to be positively driven by the drive shaft. The sections 49, 50 of a jack shaft are rotatably mounted within the sleeves and upon the inner ends of these sections are secured bevel gears, meshing with planet pinions rotatably mounted in the planet carrier. The shaft sections are also mounted near their outer ends in bearings secured to the chassis and are provided with sprocket wheels 51, 52 connected to corresponding sprocket wheels on the rear wheels by means of sprocket chains 53, 54. Upon the outer ends of the sleeves 47, 48 are secured sprocket wheels 55, 56. A counter shaft 57 is journaled in the chassis and on this shaft are secured sprocket wheels in alinement with the sprocket wheels 55, 56 and connected thereto by sprocket chains. The floating shaft 10 is connected to the counter shaft 57 by means of sprocket chains mounted on sprocket wheels on the respective shafts. I prefer to employ these chains in pairs as illustrated in order that the shaft 10 may be always properly driven during its vertical and tilting movement. The counter shaft 57 is positioned at no great distance from the pivots of the links 38 and the chains therefore are not materially tightened or slackened during the movement of the floating shaft due to unevenness in the road bed.

Fig. 6 illustrates another form of means for applying pressure downwardly upon the auxiliary traction wheels and in this construction the same means serves to raise the auxiliary traction wheels when desired. The arm 58 takes the place of the bearing arm 41 and is provided at its forward end with a bearing for the floating shaft 10. A screw 59 provided with a hand wheel at its upper end is mounted in a nut 60 fast to the chassis and extends through a hole in the arm 58. A spring 61 is mounted between the arm and a collar on the screw to press resiliently against the arm. A nut 62 and a washer 63 are secured to the lower end of the screw to provide means for raising the arm and thereby lifting the auxiliary traction wheels from the road bed when desired. The arm is shown in raised position in this figure. The springs 39 may be omitted if desired when this structure is employed.

Having described my invention, what I claim as new and desire to secure by Letters Patent, is—

1. In combination with a motor vehicle truck, a sled, means to support said sled in the chassis of said truck in a manner to permit vertical movement and rocking movement in a vertical plane but preventing lateral angular movement in a horizontal plane and means for controlling the vertical movement of the sled relative to the chassis.

2. In combination with a motor vehicle truck, a sled means to support said sled in the chassis of said truck in a manner to permit vertical movement and rocking movement in a vertical plane but preventing lateral angular movement in a horizontal plane and means operable from the forward end of the automobile for controlling the vertical movement of the sled relative to the chassis.

3. In combination with a motor vehicle truck, a sled, means to support said sled in the chassis of said truck in a manner to permit vertical movement and rocking movement in a vertical plane but preventing lateral angular movement in a horizontal plane and means for controlling the vertical movement of the sled relative to the chassis comprising vertical screw shafts, a cross shaft geared thereto and a shaft operatively connected to the cross shaft and extending forward to the front part of the motor vehicle.

4. In a motor vehicle in combination a chassis, a sled having side members constructed of steel plate, and shoes secured to said steel plate and contacting with the lower edges thereof said sled being connected to the chassis in a manner to permit rocking movement in a vertical plane and means to raise and lower said sled with respect to the chassis.

5. In a motor vehicle truck, in combination, a chassis, a sled having side members comprising steel plates, guides rigidly secured to said chassis and plates having curved edges secured to said side members and slidably mounted in said guides in a manner to permit vertical and rocking movement relative to said guides whereby the sled may move in a vertical plane relative to said chassis, and whereby angular movement in a horizontal plane is prevented.

6. In a motor vehicle in combination a frame, a sled supported for movement in a vertical plane relative thereto, said sled having side members having vertical slots in the forward ends thereof to present guides, a shaft extending laterally of said sled and having its ends guided in said slots, a traction wheel mounted near the center of said shaft, means for exerting a resilient downward pressure upon said shaft, and means for rotating said wheel.

In testimony whereof, I have signed my name to this specification, in the presence of two subscribing witnesses.

FREDRICK T. KINDAHL.

Witnesses:
CARL F. KINDAHL,
THOMAS J. DRUMMOND.

Copies of this patent may be obtained for five cents each, by addressing the "Commissioner of Patents, Washington, D. C."